July 7, 1964     E. W. PARRISH ETAL     3,139,938
SCRAPER
Filed Sept. 4, 1962     4 Sheets-Sheet 1
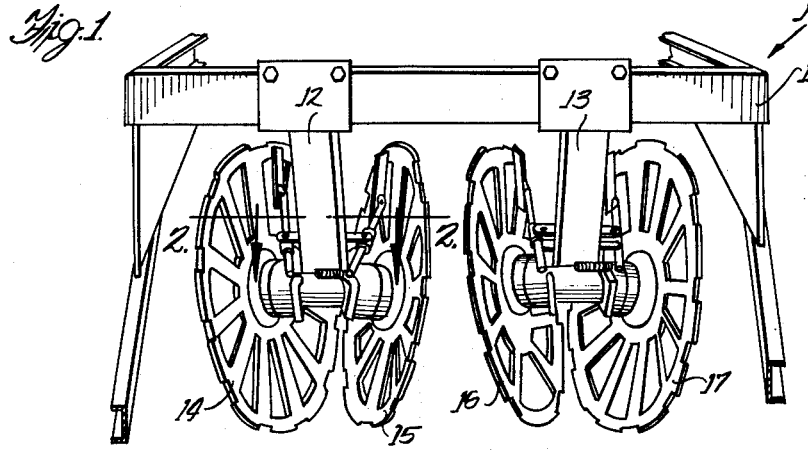
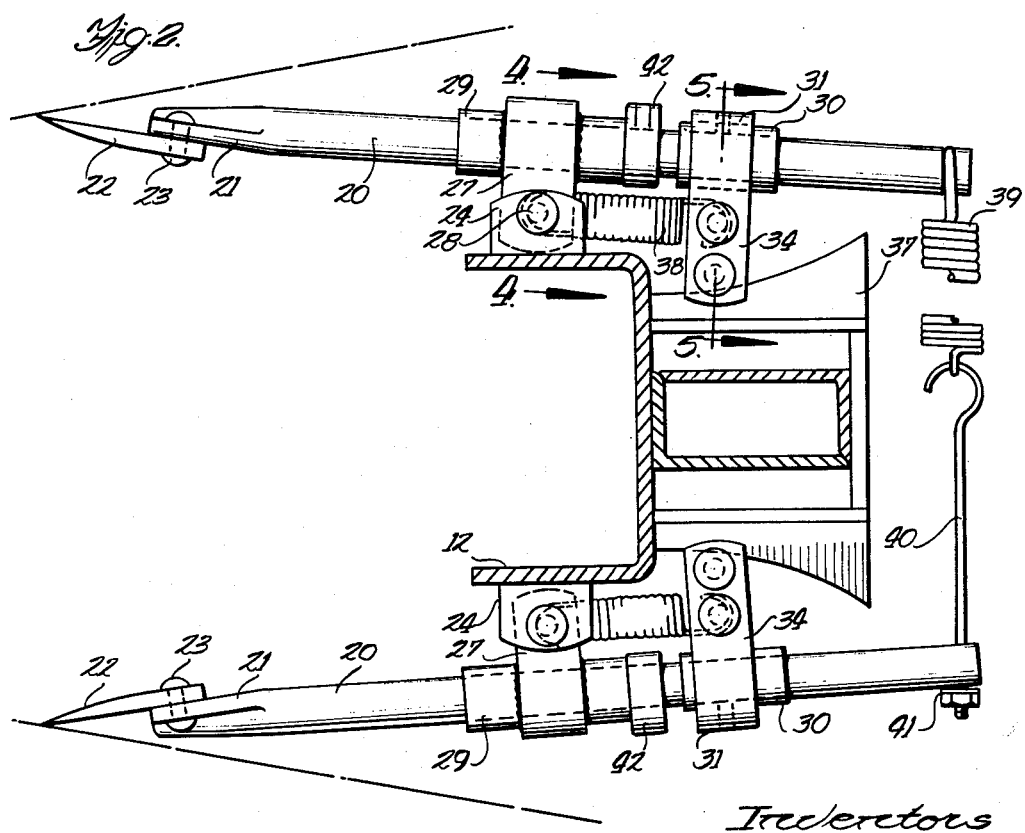
Inventors
Edward W. Parrish
John M. Moran
Attorney

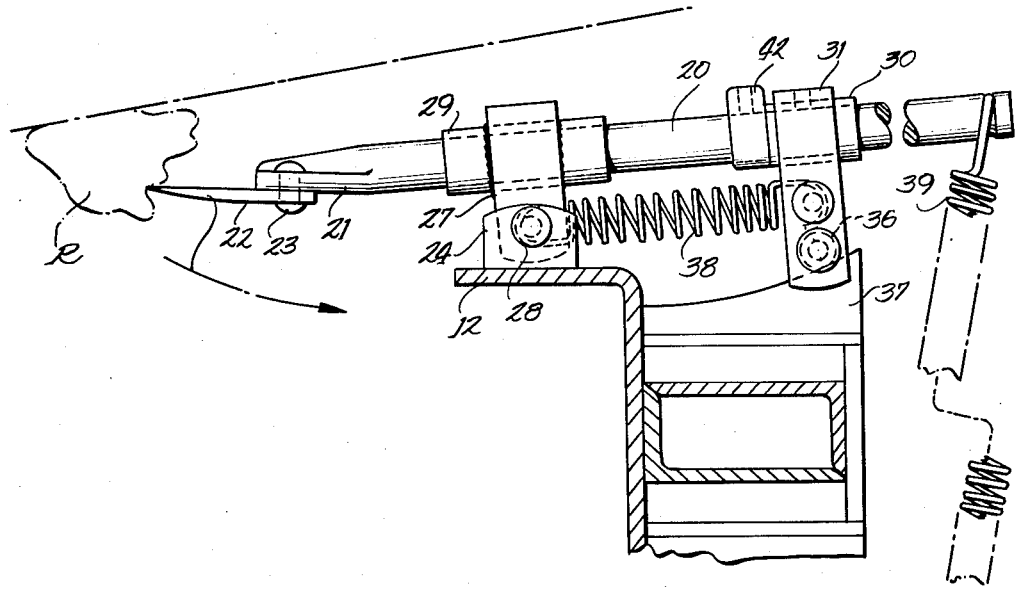
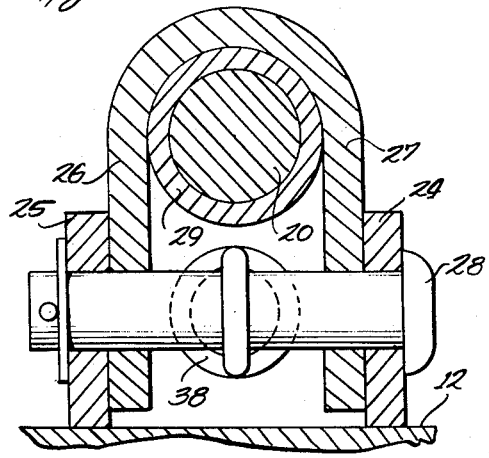
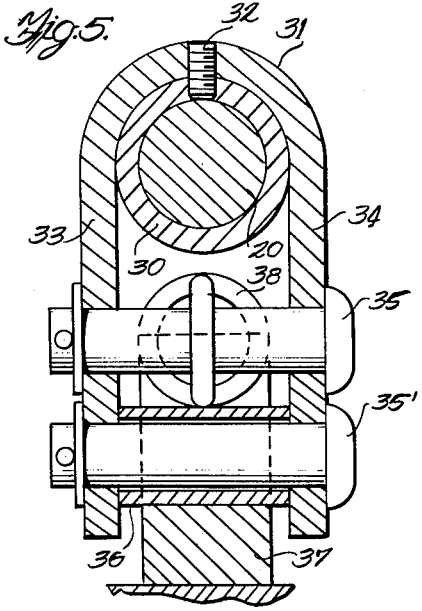

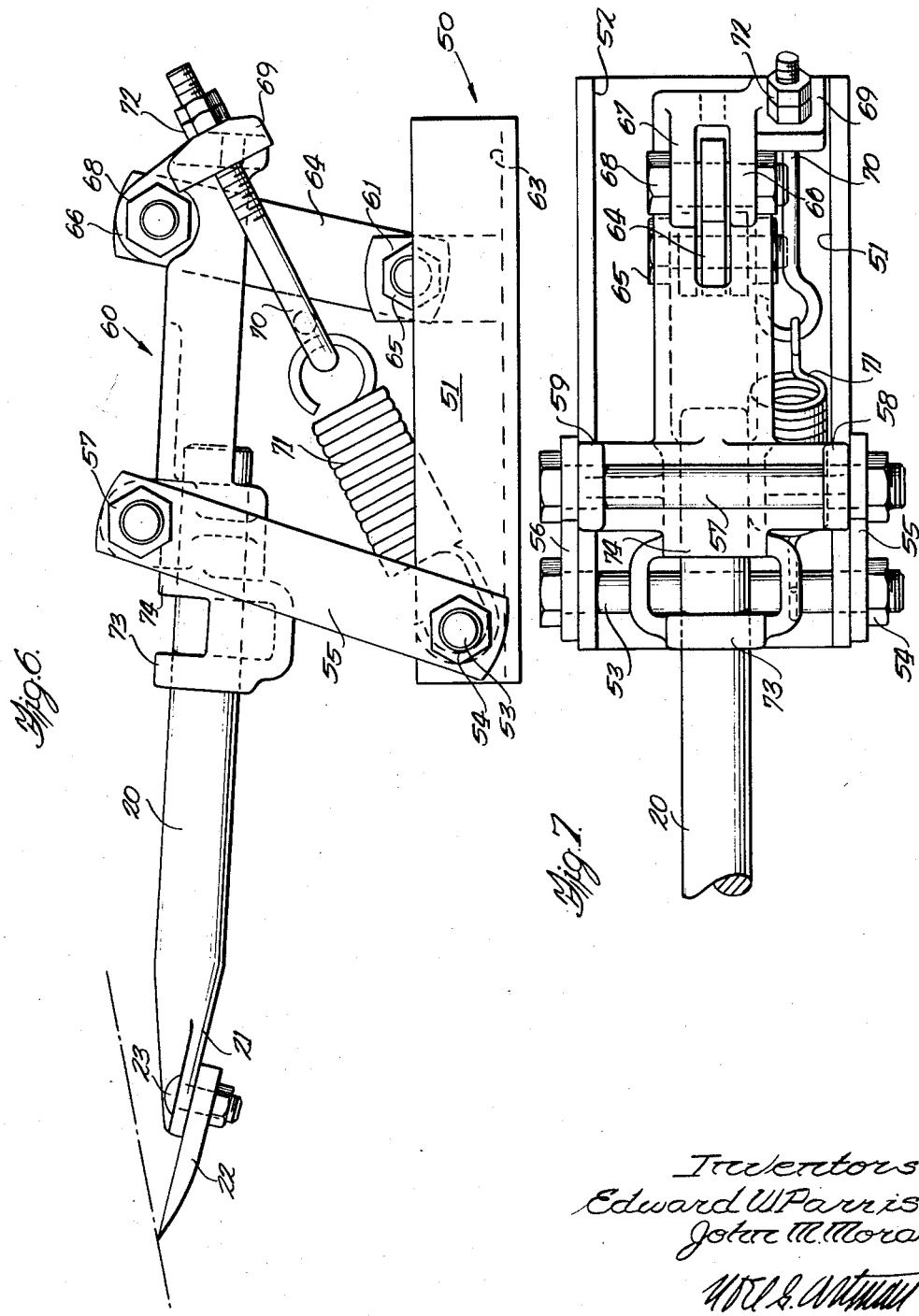

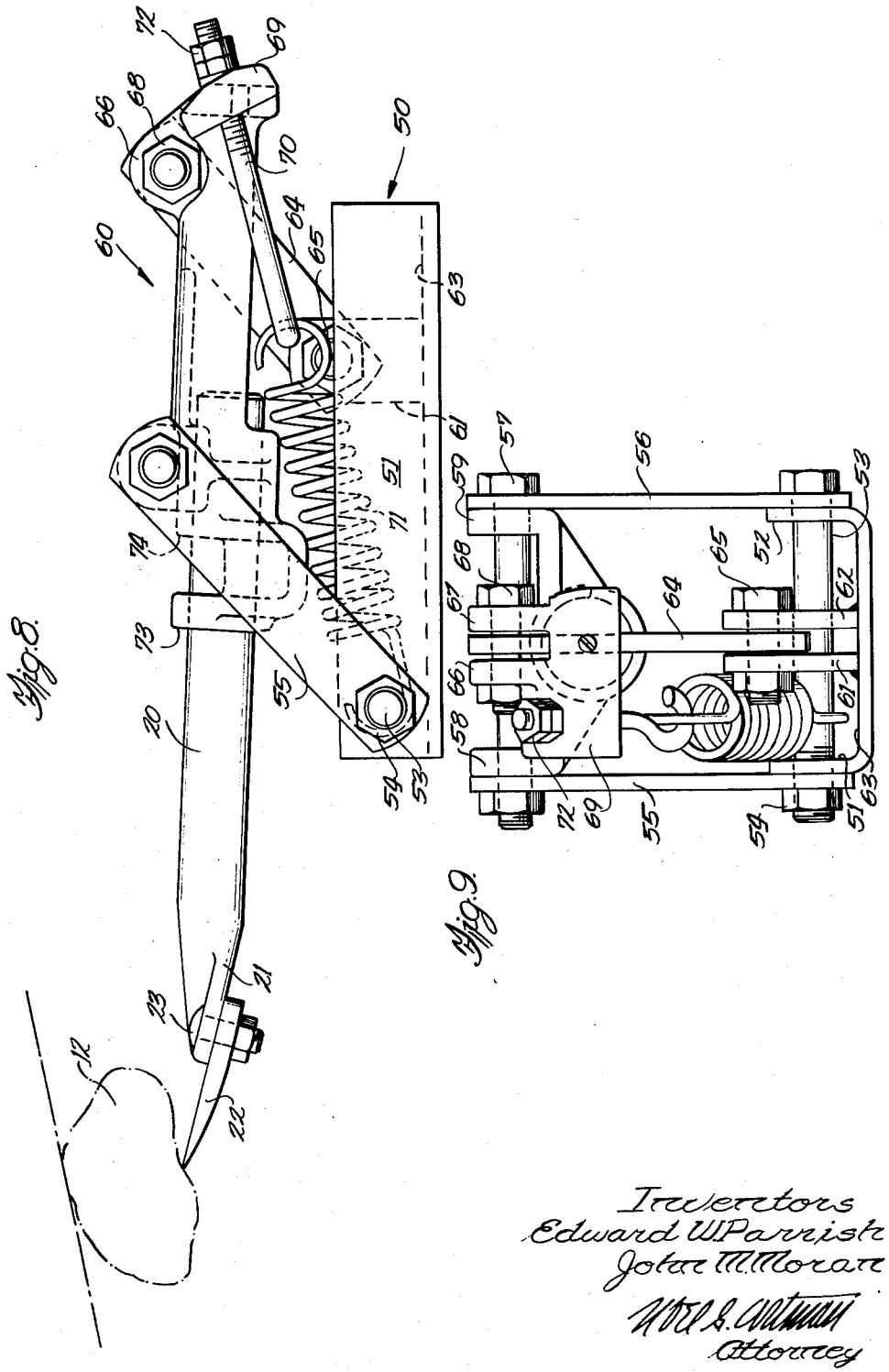

United States Patent Office 3,139,938
Patented July 7, 1964

3,139,938
SCRAPER
Edward W. Parrish and John M. Moran, Naperville, Ill., assignors to International Harvester Company, Chicago, Ill., a corporation of New Jersey
Filed Sept. 4, 1962, Ser. No. 221,060
13 Claims. (Cl. 171—58)

This invention relates in general to agricultural implements, and more particularly to a new and improved scraper usable in any agricultural implement having at least one ground-engaging wheel rotatably mounted upon a mobile frame.

In the beet harvester field it is well known to employ a mobile frame having at least one pair of wheels pivotally secured thereto, which are forced into the ground and converge rearwardly to grasp the beets and lift them from the ground. A paddle wheel, operating between the two lifter wheels, is employed to transfer the beets to a conveyor. While such machines have in general functioned satisfactorily, it has been noted that when operating in moist soil, mud and rocks have exhibited a tendency to accumulate upon the lifting wheels. This is a particularly undesirable feature in that it reduces the ground penetrability of the wheels, and also inhibits the gripping and lifting function of the wheels. Prior art devices have recognized this problem, and have provided either a pair of scrapers fixedly secured to a support disposed between the wheels, or a pair of scrapers which are pivotally secured to a support disposed between the wheels and which are capable of limited movement in one direction with respect to the wheels against the bias of spring means to pass obstructions which have accumulated upon the wheels. Such prior art devices have proven unsatisfactory in that the blade portion of the scraper is not capable of sufficient movement to pass over obstructions upon the wheels. As can be readily understood, this has often resulted in either sliding of the wheels, or severe damage to, or even destruction, of the scrapers. The general purpose of this invention is therefore to provide a scraper for use with an agricultural implement having at least one ground-engaging wheel in which the blade portion of the scraper is capable of sufficient movement to pass any obstruction which may have accumulated upon the wheel. To attain this, the present invention contemplates a unique mounting structure by which the shank of the scraper is secured to the frame of the implement, and that enables the blade portion of the scraper to move both back and away from the wheel when an obstruction is encountered.

An object of the present invention is the provision of mounting structure for a wheel engaging scraper which enables said scraper to move longitudinally and pivotally with respect to its support.

Another object of the invention is to provide a scraper for a ground-engaging wheel in which the scraper blade is capable of moving back and away from the wheel to bypass obstructions accumulated upon the wheel, and which will automatically return into scraping engagement with said wheel when said abstruction is passed.

A further object of the invention is to provide in a scraper of the type hereinafter set forth means for adjusting the scraping force of the scraper upon the wheel.

Other objects and advantages of the invention will hereinafter become more fully apparent from the following description of the annexed drawings, wherein:

FIGURE 1 is a perspective view of a portion of a beet harvester employing the present invention;

FIGURE 2 is a plan view, partly in section, taken along the line 2—2 of FIGURE 1;

FIGURE 3 is a plan view similar to FIGURE 2 but showing one scraper after it has swung back and away from the ground-engaging wheel;

FIGURE 4 is a sectional view taken along the line 4—4 of FIGURE 2;

FIGURE 5 is a sectional view taken along the line 5—5 of FIGURE 2;

FIGURE 6 is a plan view of another embodiment of the invention;

FIGURE 7 is a side elevational view of the structure set forth in FIGURE 6;

FIGURE 8 is a view similar to FIGURE 6 but showing the scraper having moved back and away from the ground-engaging wheel; and FIGURE 9 is an end view of the structure set forth in FIGURE 6.

Referring now to the drawings, wherein like reference characters designate like or corresponding parts throughout the several views, the beet harvester illustrated in FIGURE 1 is designated in its entirety by reference numeral 10. Beet harvester 10 is of the two-row variety, having standards 12 and 13 mounted in depending fashion from a mobile frame 11. Spaced-apart pairs of rearwardly converging beet digging and lifting wheels 14–15 and 16–17 are rotatably mounted in standards 12 and 13 respectively. As is well known in the art, when a source of motive power is applied to frame 11, wheels 14–15 and 16–17 grasp the beets as the wheels rotate, and lift them from the ground into a position where they are transferred to a conveyor for further processing. In order to enhance the beet gripping and lifting function of the wheels, it has been found desirable to provide scraping members which are biased into engagement with the inner surfaces of the lifting wheels to remove dirt and other accumulated materials which become packed thereon during operation.

One embodiment of the novel scraping means of the present invention is illustrated in detail in FIGURE 2, and includes a longitudinally extending scraper shank 20 having a narrowed end portion 21 to which blade 22 is secured as by rivet 23 or the like. Each of the individual scrapers are identical, so that a description of one is deemed sufficient to set forth the novel structural features. Spaced-apart apertured lugs 24 and 25 are fixedly secured to the wheel-facing sides of standard 12. A U-shaped member having apertured leg portions 26 and 27 is pivotally secured between lugs 24 and 25 by pin 28. A hollow cylindrically-shaped sleeve 29 is fixedly secured in the closed end of the U-shaped member as by welding or the like. Shank 20 is slidably received within sleeve 29, and is constrained thereby for reciprocating movement with respect to support 12 and back from said beet lifting wheel.

A second hollow cylindrically-shaped sleeve 30 is provided in the closed end of a second U-shaped member 31, and is adapted to receive shank 20. The closed ends of U-shaped member 31, and sleeve 30, are provided with threaded apertures for reception of a set screw 32 which secures sleeve 30 at a predetermined point along shank 20. A first pin 35 is secured between legs 33 and 34 of U-shaped member 31 at an intermediate position therealong. A second pin 35' is provided adjacent the end of legs 33 and 34 and is provided with a roller sleeve 36 which surrounds the shank of pin 35' and extends between legs 33 and 34. As can be readily understood from an examination of FIGURE 2 and FIGURE 3, sleeve 36 acts as a follower member and is adapted to roll upon the arcuately shaped cam member 37 which is fixedly secured to standard 12 as shank 20 moves longitudinally with respect to standard 12. A coil spring 38 is connected between pin 28 and pin 35, and is adapted to return the scraper into engagement with the wheel after the obstruction is cleared.

A coil spring 39 is connected between the end portions of scraper shanks 20, and pivots them around pin 28 into scraping engagement with the beet lifting wheels. The amount of force which blades 20 exert upon the inner surfaces of the wheels may be adjusted by threading nuts 41 along the threaded end portion of hook member 40.

The operation of the scraping device when an obstruction is encountered upon the beet lifting wheel will be best understood from an examination of FIGURE 3. It will be noted that as blade 22 encounters an obstruction such as a rock designated at R, shank 20 will slide axially through sleeve 29 against the bias of spring 38. As shank 20 moves rearwardly, roller 36 rides up arcuate cam member 37 and causes shank 20 to pivot around pin 28 thus enabling the blade 22 to clear the obstruction. When the obstruction is cleared, spring 38 will return shank 20 to the desired position as determined by the engagement of an adjustable stop member 42 with sleeve 29.

Referring now to FIGURES 6–8, there is shown a second preferred embodiment of mounting structure for shank 20 which enables blade 22 to clear an obstruction by moving back and away from the beet lifting wheel. The second preferred embodiment includes a longitudinally extending U-shaped member 50 which is fixedly secured to the wheel-facing sides of standard 12, not shown. Legs 51 and 52 of member 50 are apertured at one end for reception of bolt 53, which is secured therebetween by nut 54. A first pair of links 55 and 56 are pivotally mounted at one end upon bolt 53. The other ends of links 55 and 56 are pivotally secured to a bolt 57 which is secured between apertured ears 58 and 59 formed upon holder 60. A pair of spaced-apart apertured upstanding lug members 61 and 62 are fixedly secured to the bight portion 63 of member 50. A link 64, which is disposed substantially parallel to links 55 and 56, is pivotally connected between lugs 61 and 62 by bolt 65. The other end of link 64 is pivotally secured between the apertured ears 66 and 67 which are provided at the rearwardly extending end of holder 60 by a bolt 68. Holder 60 is further provided with an apertured arm 69, which is adapted to receive the threaded end of hook member 70. A coil spring 71 is connected between bolt 53 and hook 70, and is adapted to bias blade 22 into scraping engagement with the beet-engaging surface of the lifting wheels, and to resist the rearward movement of shank 20 when an obstruction is encountered upon the wheel. The scraping force which blade 22 exerts upon the beet lifting wheel may be adjusted and regulated by threading nuts 72 upon hook 70. Holder 60 is provided with a pair of spaced-apart sleeve like portions 73 and 74 which firmly grip shanks 20 therein.

In operation, when blade 22 encounters an obstruction such as a rock R, shank 20 will be bodily forced rearwardly in a direction axially of said shank against the bias of the spring 71. In response to the rearward movement of shank 20, links 55–56 and 64 will pivot about bolts 53 and 65 respectively, to swing shank 20 transversely closer to support 12 and correspondingly move blade 22 away from the belt-engaging surface of the lifting wheel. After the obstruction has been cleared, spring 71 will return blade 22 back into the proper wheel-engaging scraping position.

Thus it can be seen that the objects of the invention have been fully achieved and that what has been provided is a mounting means for a scraper which enables the blade to move both back and away from the surface to be cleaned so as to clear any obstructions which adhere thereto. It must also be realized that changes in the apparatus may be made without departing from the spirit and the scope of the invention as defined in the appended claims.

What is claimed is:

1. A scraper for use with an earth-engaging wheel rotatably mounted upon a mobile frame comprising: a support fixedly secured to said frame, a blade adapted to engage said wheel, forward link means having a first end pivotally secured to said support and a second end pivotally secured to said blade, rear link means having a first end pivotally secured to said support and a second end pivotally secured to said blade, and spring means connected between the first end of said forward link means and the second end of said rear link means to bias said blade into scraping engagement with said wheel.

2. The invention as set forth in claim 1 wherein said forward link means is substantially parallel to said rear link means.

3. The invention as set forth in claim 1 wherein means are provided for adjusting the tension in said spring means.

4. A scraper for use with an earth-engaging wheel rotatably mounted upon a mobile frame comprising: a support fixedly secured to said frame, a blade adapted to engage said wheel, spring means associated with said blade and adapted to bias said blade into scraping engagement with said wheel, a sleeve pivotally associated with said support and slidably receiving said blade for reciprocating movement with respect to said support, cam means mounted on said support, and follower means associated with said blade and cooperable with said cam means to shift said blade away from said wheel in response to reciprocating movement of said blade.

5. The invention as set forth in claim 4 wherein means are provided for adjusting the tension in said spring means.

6. The invention as set forth in claim 4 wherein spring means are connected between said sleeve and said follower means to resiliently restrict the movement of said follower means along said cam means and to resiliently urge said follower means into its initial unmoved position.

7. The invention as set forth in claim 4 wherein stop means are provided on said blade engageable with said sleeve to limit the reciprocating movement of said blade in one direction.

8. The invention as set forth in claim 7 wherein said stop means are adjustable along said blade.

9. A scraper for use with an earth-engaging wheel rotatably mounted upon a mobile frame comprising: a support fixedly secured to said frame, a blade adapted to engage said wheel, spring means associated with said blade and adapted to bias said blade into scraping engagement with said wheel, a first sleeve pivotally associated with said support and slidably receiving said blade for reciprocating movement with respect to said support, cam means mounted on said support, a second sleeve fixedly secured to said blade, and follower means associated with said second sleeve and cooperable with said cam means to shift said blade away from said wheel in response to reciprocating movement of said blade.

10. The invention as set forth in claim 9 wherein means are provided for adjusting said second sleeve along said blade.

11. For use with a beet harvester or the like having at least one pair of beet digging and lifting wheels rotatably mounted on a mobile frame, wheel-engaging scraper means comprising: a support fixedly secured to said frame and disposed between said wheels, a pair of blade-carrying shanks positioned adjacent opposite sides of said support, mounting structure securing said shanks to said support, and resilient means associated with said shanks and urging said blades into scraping engagement with said wheels, said mounting structure including shank attaching means pivotally connected to said support for movement relative thereto, and means connecting said shanks to said attaching means for movement therewith, the connection of said shanks to said attaching means accommodating movement of said shanks relative to said support bodily in directions axially of said shanks and transversely thereof back and away from said wheels against the bias of said resilient means when obstructions upon said wheels are encountered by said blades.

12. The invention as set forth in claim 11 wherein said mounting structure includes parallel link means pivotally secured at one end to said shank and pivotally secured at the other end to said support.

13. The invention as set forth in claim 11 wherein said mounting structure includes a sleeve carried by said shank attaching means and slidably receiving said shank for reciprocating movement with respect to said support, cam means mounted on said support, and follower means associated with said shank and cooperable with said cam means to shift said blade away from said wheel in response to reciprocating movement of said shank.

References Cited in the file of this patent
UNITED STATES PATENTS

| | | |
|---|---|---|
| 882,056 | Folkerts | Mar. 17, 1908 |
| 975,499 | Beeman | Nov. 15, 1910 |
| 1,534,489 | Barnes | Apr. 21, 1925 |
| 3,010,522 | Oppel | Nov. 28, 1961 |